June 30, 1942.  W. R. POSTLEWAITE  2,287,830
METHOD OF COATING PIPE
Original Filed July 30, 1938   3 Sheets-Sheet 1
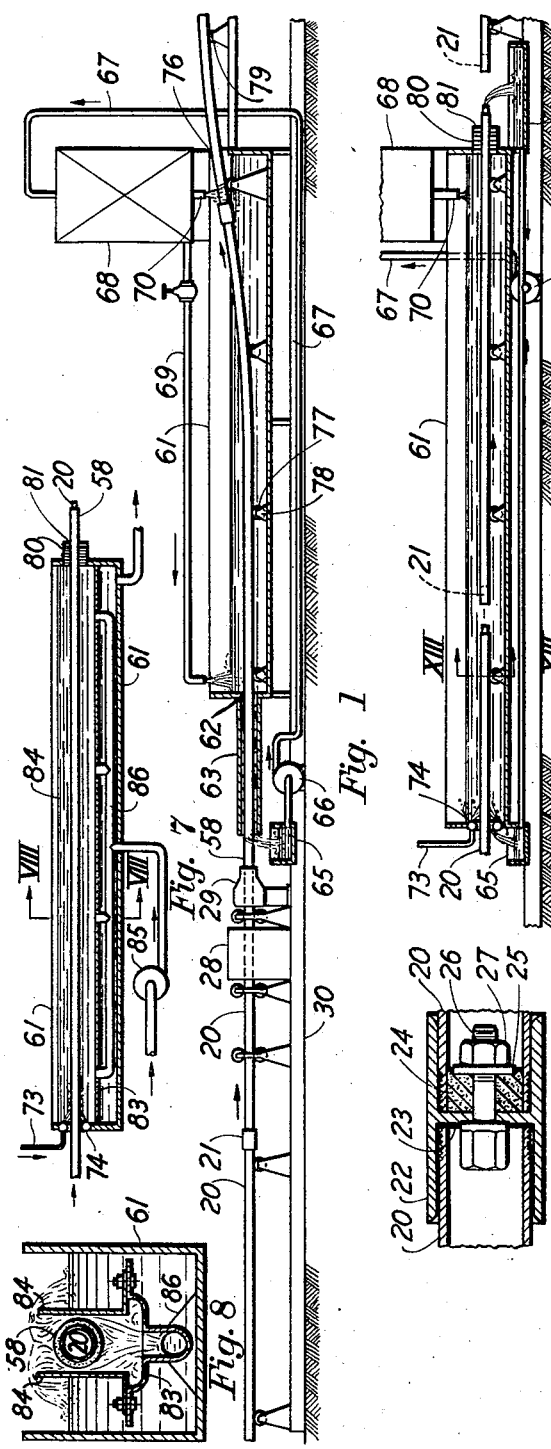
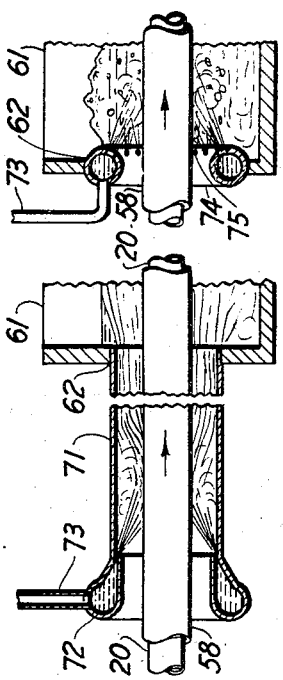
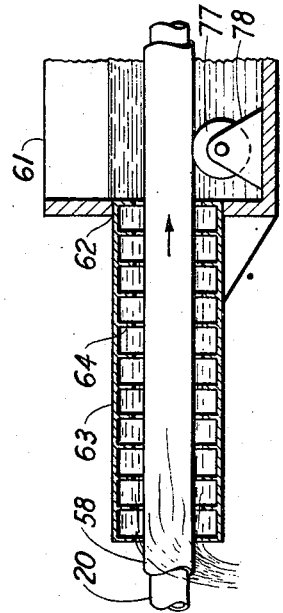
William R. Postlewaite
INVENTOR
BY
ATTORNEY June 30, 1942.  W. R. POSTLEWAITE  2,287,830
METHOD OF COATING PIPE
Original Filed July 30, 1938    3 Sheets-Sheet 2
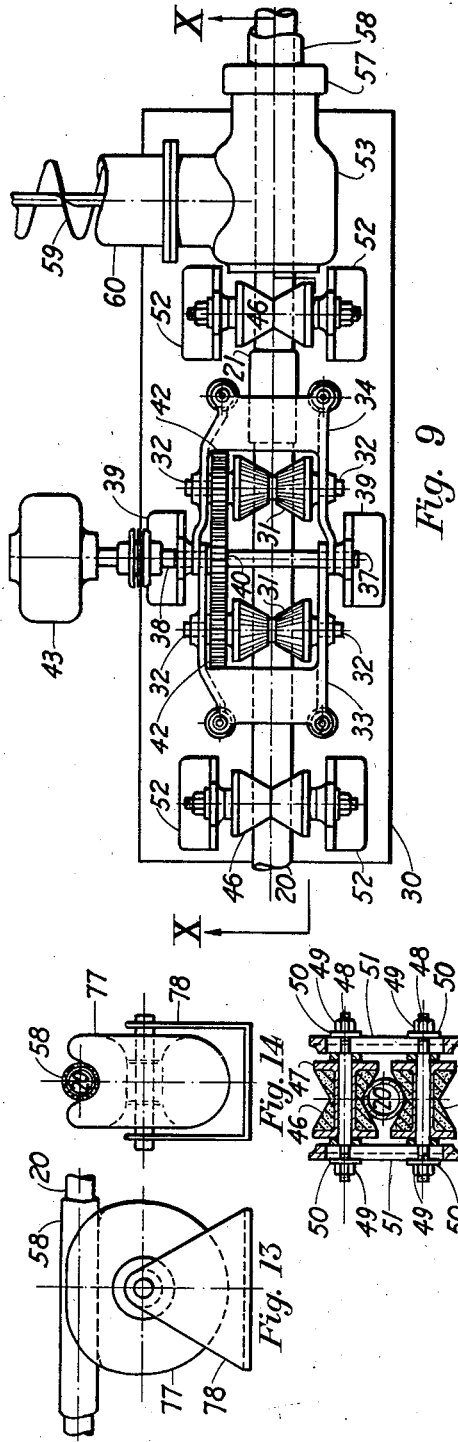
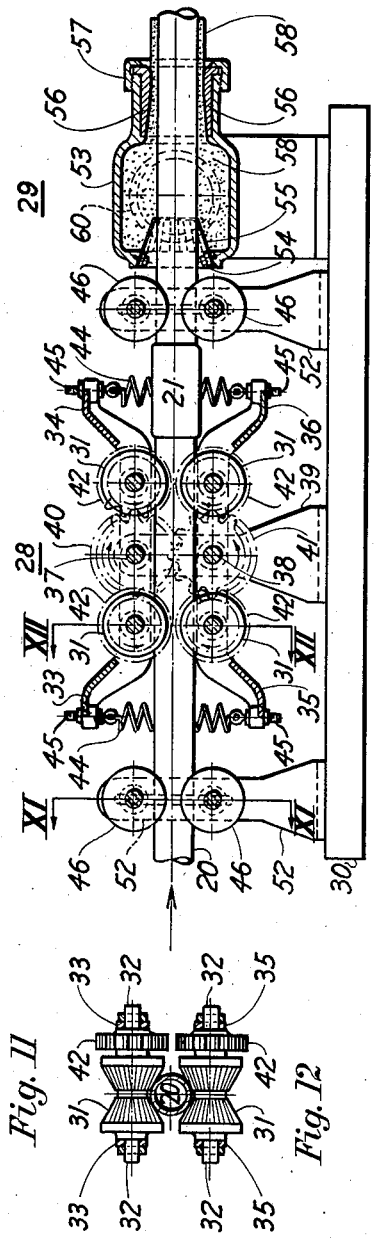
William R. Postlewaite
INVENTOR
BY
ATTORNEY

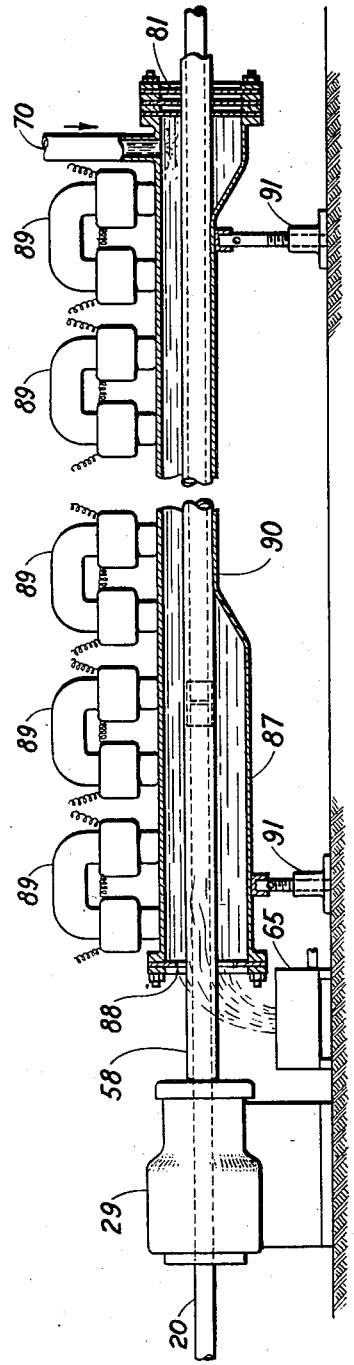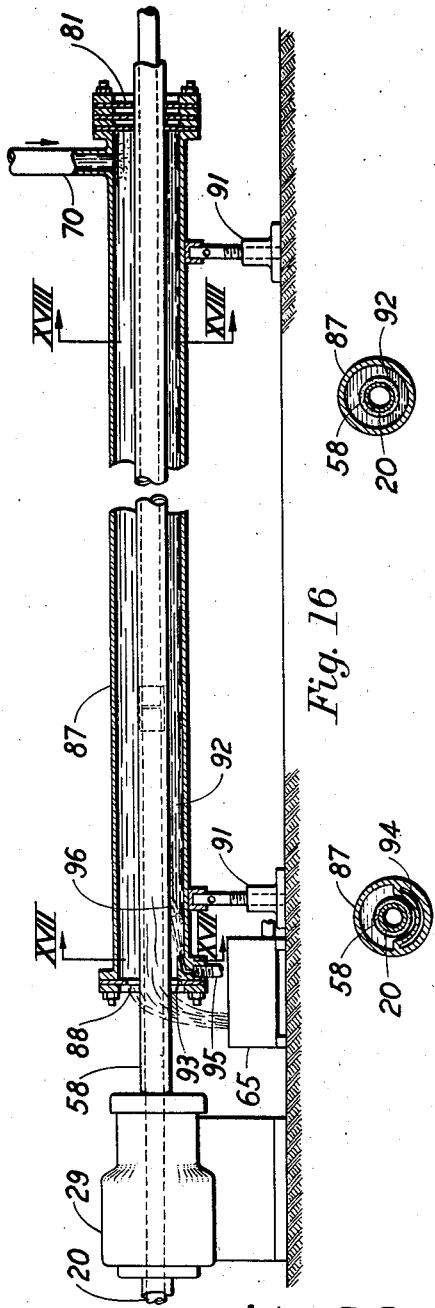

Patented June 30, 1942

2,287,830

UNITED STATES PATENT OFFICE 2,287,830

METHOD OF COATING PIPE

William R. Postlewaite, San Francisco, Calif., assignor to Standard Oil Company of California, San Francisco, Calif., a corporation of Delaware Original application July 30, 1938, Serial No. 222,207. Divided and this application May 10, 1940, Serial No. 334,390

9 Claims. (Cl. 18—59)

This invention relates to the art of coating pipes and similar tubular metallic objects with a relatively thick layer of a heated thermoplastic material, such as a bituminous mastic, to form a corrosion-resistant sheath, and particularly relates to the method and apparatus for cooling the coating so that the finished product may be rapidly and economically handled from the coating equipment without damage to the sheath. This application is a division of my copending case Serial No. 222,207, filed July 30, 1938, entitled Apparatus for cooling coated pipe.

Heretofore, it has not been considered economical to coat steel pipes and the like of relatively small diameter, for example, 4 inch nominal diameter and smaller, with thick hot mastic coatings of the type described and claimed in United States Patent No. 1,984,649, issued December 18, 1934 to C. S. McDonald et al. Extrusion methods such as those of my Patent No. 2,040,876, issued May 19, 1936, have been successfully used on pipes from 4 to 18 inches in diameter, these methods being necessarily slow due to the difficulty in cooling the large body of hot material surrounding the pipe and to the physical handling of the long and heavy pipe sections, these latter weighing upward of two tons. Smaller pipe requires rapid handling if an adequate amount is to be economically coated in a given time, and also there is a correspondingly larger demand for it. Certain factors, such as the provision of adequate couplers for guiding and aligning succeeding joints of pipe through the coating equipment, cooling the inside as well as the outside of the coated pipe, provision for maintenance of axial alignment of the pipe passing through an extrusion nozzle while non-deformably supporting the already coated uncooled and unsupported portion, all combine to present an entirely different set of conditions for coating small pipe sizes from that imposed by the larger diameters, and have been successfully met by this subject invention.

It is an object of this invention to provide an improved method and apparatus for the rapid coating of small diameter steel pipe with a thick layer of hot bituminous mastic materials, and particularly for the cooling and subsequent handling of the coated lengths after the actual application of the corrosion resistant sheath.

Another object is to provide an improved method and apparatus for supporting the advancing end of a small diameter and hence limber and flexible pipe so that the part passing through an extrusion nozzle or similar coating means will remain axially centered to receive a uniform thickness of coating.

Another object is to provide an improved method and apparatus for a cooling, and preferably but not necessarily, a supplemental coating bath which will permit small pipe to be rapidly passed therethrough with minimum mechanical manipulation and the least damage to the sheath or covering.

Another object is to provide a method and apparatus for coating pipe of small diameter that will readily lend itself to parallel or multiple operation, by mounting several units side by side in the same housing and supplying them from a common source of material.

Another object is to provide an improved pipe feeding device that will pass couplers or connectors of larger outside diameter than the nominal diameter of the pipe, without changing the axial position of the pipe upwardly or downwardly, so that it remains in axial alignment with the coating means at all times.

Another object is to provide a coupler for temporarily joining adjacent lengths of pipe being fed forwardly through a pipe coating means that will permit cooling water or other liquid to enter the pipe so as to more rapidly cool the pipe and the coating layer thereon.

These and other objects and advantages will be more fully apparent from the following description, and from the attached drawings, which form a part of this specification and illustrate a preferred embodiment of the invention together with several alternative forms.

In the drawings:

Figure 1 is a side elevation view, partly in section, of a pipe coating apparatus showing one form of cooling method and apparatus which may be utilized.

Figure 2 is a side elevation view, partly in section, of an alternative form and mode of operation of cooling apparatus in which the inside of the pipe as well as the outer surface of the coating is exposed to the cooling bath.

Figure 3 is a longitudinal sectional view, to an enlarged scale, of a labyrinth inlet for admitting hot freshly coated pipe below the surface of a cooling bath with minimum liquid loss from the latter.

Figures 4 and 5 are longitudinal sectional views of alternative submerged pipe inlets to a similar cooling bath, using inwardly directed liquid jets to reduce liquid loss from the bath.

Figure 6 is a longitudinal sectional view of a coupler suitable for practicing this invention, adapted to axially align two lengths of pipe being coated, the following pipe section acting to urge forwardly the leading pipe section.

Figure 7 is a longitudinal sectional view of an alternative arrangement of cooling bath with a parallel liquid jet arrangement for supporting the freshly coated and uncooled pipe during its traverse of the bath, to prevent deformation of the sheath.

Figure 8 is a transverse sectional view on line VIII—VIII of the jet supporting arrangement of Figure 7.

Figure 9 is a plan view of a pipe driving means and an extrusion nozzle particularly adapted to feed and maintain in proper axial alignment the pipe and couplers being coated with a thick layer of hot mastic material.

Figure 10 is a vertical sectional view of the pipe driving means and extrusion nozzle shown in Figure 9, taken on line X—X of that figure.

Figure 11 is a vertical sectional view on line XI—XI of Figure 10 and illustrates resilient guide rollers to keep the pipe and couplers in axial alignment with the extrusion nozzle.

Figure 12 is a vertical sectional view on line XII—XII of Figure 10 and illustrates an arrangement of power driven traction rollers adapted to urge the pipe being coated axially through the extrusion nozzle.

Figure 13 is a side elevation view of one form of resilient pneumatic support for the newly coated and incompletely cooled pipe as it passes through the cooling bath.

Figure 14 is an end elevation view of the pipe support shown in Figure 13, illustrating the soft pneumatic tire which distributes the load along a considerable length of the still plastic coating to prevent deformation thereof.

Figure 15 is a side elevation view, partly in section, of an alternative form of cooling apparatus in which a number of suitably arranged electromagnetic elements are used to partially support the coated pipe.

Figure 16 is a side elevation view, partly in section, of an alternative form of cooling apparatus in which a dense immiscible liquid such as mercury is used to support the freshly coated pipe.

Figure 17 is a vertical sectional view on line XVII—XVII of Figure 16, showing a form of liquid jet for preventing loss of mercury from the cooling bath.

Figure 18 is a vertical sectional view on line XVIII—XVIII of Figure 16, showing how the heavy liquid, such as mercury, would serve to support the coated pipe without deformation of the coating layer.

Referring to the drawings and particularly to the general arrangement of Figure 1, reference numeral 20 designates the sections of pipe or other cylindrical objects to be coated successively entering the apparatus from the left end and being urged toward the right a short distance by hand or any other suitable means. Pipe 20 is preferably prepared for coating by being cleaned, dried and coated with a suitable primer, which may be a cut-back asphalt or proper asphaltic composition that has been dried or hardened to form a thin layer that will soften to establish a bond between the pipe surface and the bituminous mastic to be applied in the extrusion nozzle which will be described below.

Succeeding lengths of pipe 20 are kept in alignment as they pass through the coating equipment by means such as the coupler 21 shown in Figure 6, described and claimed in my copending divisonal application Serial No. 331,849 filed April 26, 1940. This coupler may be secured to the leading section of pipe 20 and provides a cup or receptacle for freely receiving the advancing end of the following section of pipe, for a purpose which will be apparent below. This form of coupler comprises a hollow cylindrical metal body 22 of an internal diameter to freely receive the pipe to be coated. A metal partition 23 separates the body into two chambers, in one of which is contained a cylindrical block 24 of resilient material, such as "Neoprene" held against partition 23 by a washer 25, bolt 26 and nut 27. The outer diameter of resilient block 24 is such that it will freely enter the inside of the pipe 20 to be coated. When the head of bolt 26 is turned, block 24 is compressed longitudinally and spreads radially to engage the inside of the leading section of pipe 20, thus holding coupler 21 in place thereon. The end of the next following section of pipe 20 may then be advanced into the chamber at the trailing end of coupler 21, and is readily removable therefrom after the coating has been applied.

The lengths or sections of pipe 20, aligned by couplers 21 are engaged by the drive means generally designated 28 and are forced axially toward the right into and through a coating means, such as the extrusion nozzle generally designated 29, in which a thick layer of a hot bituminous mastic, for example, is applied. The thickness of the coating usually varies depending upon the nature of the mastic, the diameter of the pipe and the severity of the corrosion producing agents against which the pipe is to be protected, and may range from ¼ inch for one inch pipe to ½ inch for four inch pipe. Couplers 21 must obviously be of slightly less thickness than the final coating in order to pass the coating means 29.

Referring now to Figures 9, 10, 11 and 12 which illustrate one form of drive means 28 and coating means 29, it will be noted that they are preferably mounted on a suitable base 30 to preserve accurate alignment. Drive means 28, in this example, comprises two pairs of generally concave knurled rolls 31 disposed above and below the pipe 20, each pair supported to move upwardly and downwardly, respectively, when enlargements such as couplers 21, pass through the device. This is accomplished by securing the rolls 31 on shafts 32 journaled in upper swinging arms 33 and 34, and lower swinging arms 35 and 36, the bifurcated arms being pivoted at their inner ends on center shafts 37 and 38, which are in turn supported on rigid bearing standards 39. Shafts 37 and 38 carry gears 40 and 41, the two latter engaging complementary gears 42 secured to the shafts 32 of rolls 31. One of shafts 37 or 38 acts as a main drive shaft and is suitably rotated by a motor or other form of prime mover 43. The outer ends of arms 33 and 35 are joined by resilient means such as springs 44, which may be adjusted by the threaded eyebolts 45. The outer ends of arms 34 and 36 are likewise joined by similar means, all acting to urge the drive rolls 31 toward the axis of pipe 20 to insure firm contact and positive motion without seriously scarring or damaging the pipe or the primer or other preliminary coating that may be on the pipe.

In operation, assuming the lower center shaft 38 to be the driving shaft, motor 43 would be arranged to turn shaft 38 counterclockwise. Gears 42 and rolls 31 on lower arms 35 and 36 would thus be rotated in a clockwise direction and would urge the pipe to the right, in the direction shown by the arrow in Figure 10. Upper center shaft 37 would be driven clockwise by gear 40, and would in turn, rotate gears 42 and rolls 31 on upper arms 33 and 34 counterclockwise, to assist the lower rolls in moving the pipe 20 axially in the direction just mentioned. When a coupler 21 enters the driving means at the left side, rolls 31 on that side will move apart, left upper arm 33 swinging upwardly about shaft 37 and left lower arm 35 swinging downwardly about shaft 38. A corresponding action will take place when the coupler engages the two right hand rolls. After the coupler has passed either set of rolls, they will return to their original spacing. Because of the swinging arm arrangement just described which provides an uninterrupted drive for the pipe and the balanced symmetrical nature of this structure, the axis of the pipe 20 is not disturbed or moved either upwardly or downwardly, so that the alignment with the coating means 29 is maintained.

The drive means just described is primarily adapted to provide axial motion and is not intended to give support to the pipe. Support rolls 46 (Figure 11) made of rubber or similar resilient material are provided for this purpose, and are preferably sufficiently deformable to absorb the slight enlargement of the couplers 21. Rolls 46 are preferably made with steel shells 47 journalled on shafts 48 which are vertically adjustable by means of nuts 49 and washers 50 to be positioned as desired in slots 51 of spaced vertical standards 52.

The coating means 29, in this example, is best shown in Figures 9 and 10 and is of the straight extrusion type, comprising a housing 53 with an axial bore through which the pipe 20 is passed, the inlet 54 being sealed by flexible metal strips 55 and the outlet, which determines the coating thickness, being preferably in the form of a removable tapered sleeve 56 secured to housing 53 as by a threaded collar 57. Hot bituminous mastic 58 is forced into housing 53 as by a suitably driven helical feed screw 59 in cylinder 60 at one side of housing 53. If desired, suitable heating means may be provided for housing 53, to keep the mastic therein from becoming chilled.

The operation of the coating means is believed to be obvious from the drawings. Thermoplastic material 58 is continuously fed into housing 53, for example, at a temperature of 350–450° F. for mastic of a graded mineral aggregate containing 10–15% asphalt, by pump screw 59 and the pipe 20 is likewise continually passed into and through the housing, entering through seal 55 and emerging through sleeve 56 with a dense coating 58 which is somewhat soft and plastic at the temperature of application, but which will set to a hard, dense, impermeable layer upon cooling. The couplers 21 will deform flexible strips 55 and will also pass through sleeve 56 so that they will also receive a thinner mastic layer, which may be scraped, melted or chipped off so that the cleaned couplers may be returned to the left end of the apparatus and installed in uncoated pipe to guide and align it in its passage through the equipment. The couplers also serve to protect the ends of pipe sections 20 as they pass through the coating means to prevent mastic entering the pipe itself, and also act to leave uncoated the ends of the pipe so that they need not be cleaned for threading or welding at the time of installation. The structure of these couplers is claimed in my copending divisional application Serial No. 331,849, filed April 26, 1940, entitled Pipe coating coupler.

It has been found that small pipe, for example 4 inch nominal diameter and smaller, is so flexible and difficult to rack or stack for air cooling of the coating 58 without damage to the latter that such mode of cooling is uneconomical and impractical. Also, liquid spray cooling is little better, due to the quantity of water that must be used and the difficulty of supporting the pipe without damaging the coating during the spraying and hardening period. This invention contemplates introducing the hot newly coated pipe directly into a liquid cooling bath below the surface thereof, thereby enabling a very rapid coating rate to be practicable and economical due to the high speed of cooling, heretofore the limiting factor, and to the possibility of cooling the inside of the pipe as well as the outer surface of the coating, as will be described below for one embodiment of the invention.

Referring to the embodiment of Figure 1, the hot coated pipe 20 with its layer of mastic 58 emerges from the coating means 29 and enters a tank 61 in which water or a suspension of hydrated lime in water is maintained by means which will be described. Various means may be employed to control undue leakage or loss of water at the inlet 62 of the tank 61, such as the labyrinth of Figures 1 and 3. This comprises a tube or pipe 63 extending from inlet 62 toward the coating means 29, and provided with a plurality of circular baffles 64 which clear the coating 58 on pipe 20 but serve to prevent too much water from flowing back through the annular space that is left. That water that does escape is caught in trough 65, where it is picked up by a pump 66 and returned through pipe 67 to a cooling tower 68, whence it returns through pipes 69 and 70 to the main tank 61 for reuse.

As an alternative to the inlet sealing means or control just described, Figure 4 illustrates a tube 71 which extends from inlet 62 toward coating means 29 and terminates in an inwardly and forwardly directed annular nozzle 72. Water from any suitable source is introduced into nozzle 72 through pipe 73 and emerges from the nozzle at a rate sufficient to prevent any outward flow from tube 71. A second alternative is shown in Figure 5, and comprises an annular pipe 74 set into inlet 62 and provided with a plurality of openings 75 directed inwardly and toward the direction of pipe motion. Water or compressed air is discharged inwardly into tank 61 and it, together with the steam evolved at that point from the hot mastic coating 58 will substantially prevent or control outflow along the pipe.

Referring again to the embodiment of Figure 1, it will be noted that the coated pipe is directed through tank 61 and emerges therefrom at 76 at a point above the level of the water or other liquid. It has been found that 4 inch and particularly smaller diameter pipe is so flexible that the deformation thus required is not excessive, and furthermore does not injure the mastic coating at temperatures below 200° F., to which it will be cooled by the water bath. During the passage of the coated pipe through the bath of Figure 1, and particularly near the inlet 62 it is desirable to uniformly support the coated pipe at a plurality of points with a low unit bearing pressure, preferably by a soft resilient means such as the large diameter and large sectioned rubber tire 77 shown in Figures 13 and 14. This tire 77 is preferably a "wheelbarrow" type inner tube and is supported in a suitable bracket 78. The water in tank 61 will serve to prevent sticking of the mastic to the tire and the unit load is preferably maintained low so that no deformation of the still warm and plastic coating will occur.

After the coated pipe has emerged from the tank 61 it may readily be handled on ordinary rolls 79, the coupled sections disengaged and the couplings 21 removed and cleaned for reuse. If hydrated lime is suspended in the cooling water bath, a layer of whitewash will automatically be deposited on the coating and will serve to prevent subsequent sticking of the coated pipe as well as to protect the coating against atmospheric and light effects that may be detrimental.

It has also been found that the cooling arrangement of Figure 2 which involves the removal of the coated pipe at a point below the level of the water in tank 61, and in addition contemplates the separation of the sections of pipe 20 as indicated in that figure, has advantages for certain operating conditions. In this figure, the outlet through which the cooled coated pipe leaves tank 61 comprises a tube 80 in which are disposed a plurality of spaced flexible annular sheets 81 of rubber or the like which permit the passage of the coating 58 but restrict the flow of water. That water that does escape is caught in an elongated trough 82, whence it is picked up by pump 66 and sent to the cooling tower 68 through line 67, being returned to tank 61 through line 70. This embodiment also involves the resilient pipe support means 77 of Figures 13 and 14. As shown in Figure 2, it may be desirable to separate the coupling 21 from the trailing section of pipe 20, thus permitting water from tank 61 to flow into that section and cool the inside of the pipe, increasing the cooling rate and permitting faster operation thereby. Separation may be accomplished by manually or mechanically pulling ahead the preceding section of pipe and keeping it separated from the trailing section. The unevaporated water that is left in the sections as they leave the bath may be caught in elongated trough 82, as shown at the right end of Figure 2.

Figures 7 and 8 illustrate an alternative form of support for the coated pipe as it is cooled in tank 61, in which an upwardly flowing stream of water is used. This may be accomplished by providing a secondary trough 83 in tank 61, with adjustable side walls 84. Water is forced into the bottom of trough 83 by a pump 85 and distributed therein by a pipe manifold 86. The water rises in the confined space between the side walls 84 and overflows into tank 61, the upward flow tending to float or lift the coated pipe 20 to maintain its alignment, and also to cool the hot mastic coating 58 so that it will pass out of the tube 80 through sheets 81 without deformation and will be in condition for immediate stacking or other disposal.

Figure 15 illustrates another alternative support for the coated pipe, particularly where a closed tank 87 is used, supplied with cooling water as from pipe 70 and fitted with an outlet seal comprising flexible annular discs 81. The inlet seal may be of any of the types previously described or may be a single annular disc 88, overflowing into a catch basin 65. Tank 87 is constructed of brass or other nonmagnetic material and is provided with a plurality of electromagnets 89 energized from a suitable source of direct current and controlled by conventional means to exert an upward force on the steel pipe 20 as it passes through the cooling bath, to almost overcome the weight of the pipe. The lower part of tank 87 may be raised through a part of its length as at 90 so that the coated and partly cooled pipe may bear lightly thereon and so be guided through the bath. Jacks 91 are preferably provided so that the tank 87 may be accurately adjusted vertically to be aligned with the moving pipe 20.

A still further alternative to those described for uniformly and nondeformably supporting the freshly coated pipe in the cooling bath is shown in Figure 16, in which a closed tank 87 is used, and in the lower part of which is a heavy, dense immiscible liquid such as mercury 92. The mercury in this example will serve adequately to support the coated pipe as shown in Figure 18, and only presents the problem of preventing its loss around the inlet 88. One means of preventing loss of mercury at that point is shown at 93 and comprises a semi-annular jet or nozzle 94 in the lower part of the tank 87, and through which water is passed from pipe 95, to be jetted against the mercury and cause it to pile up as at 96. Jacks 91 are also of value, to level the closed tank 87 and to accurately align it with pipe 20.

It will be apparent from the foregoing descriptions and the drawings that an improved method and apparatus for applying a thick coating of hot bituminous mastic to small diameter pipe and for rapidly and economically cooling the coated pipe have been disclosed. Obviously, certain modifications and changes could be made without departing from the essential features of the invention, and all such that fall within the scope of the appended claims are embraced thereby.

I claim:

1. A method of continuously coating pipe comprising the steps of continuously advancing a pipe and simultaneously extruding a thick layer of heated thermoplastic material on the outer surface of said pipe, and immediately thereafter, and prior to any contact of said coated pipe with any solid supporting surface, passing said coated pipe below the surface of a liquid bath to cool and harden said coating to a degree where it may be supported without material deformation of said thermoplastic material.

2. A method of continuously coating pipe comprising the steps of coupling successive sections of pipe together to form a continuous portion, extruding a thick layer of heated thermoplastic material on the outer surface of said continuous portion, and immediately thereafter, and prior to any contact of said coated continuous portion with any solid supporting surface, passing said coated continuous portion below the surface of a liquid bath to cool and harden said coating to a degree where it may be supported without material deformation of said thermoplastic coating material, and then separating said coupled sections.

3. A method of coating pipe comprising the steps of temporarily coupling successive sections of pipe together to form a continuous portion, covering the ends of said sections, extruding a thick layer of hot thermoplastic material on the outer surface of said continuous portion intermediate the protected end sections, and immediately thereafter, and prior to any contact of said coated continuous portion with any supporting surface, immersing said coated continuous portion in a liquid cooling bath to cool and harden said coating to a degree where it may be supported without material deformation of said thermoplastic coating material, and then separating said coupled sections, and uncovering said pipe ends, said ends being free of coating material so that they may be threaded, welded or otherwise secured together without first having to be cleaned of said coating material.

4. A method of continuously coating pipe comprising the steps of coupling successive sections of pipe together, covering the ends of said sections, extruding a thick layer of hot thermoplastic material on the outer surface of said pipe intermediate the protected end sections, immediately thereafter, and prior to any contact of said coated pipe with any solid supporting surface, passing said coupled sections of coated pipe into a liquid bath to cool and harden said coating to a degree where it may be supported without material deformation of said thermoplastic material, and during the passage of said coupled sections through said liquid bath, separating said sections so that said liquid will enter said pipe and cool the interior thereof.

5. A method of continuously coating pipe comprising the steps of extruding a thick layer of hot thermoplastic material on the outer surface of said pipe, and, before deforming said plastic and adhesive coating by contact with any support, immediately passing said coated pipe below the surface of a liquid bath to cool and harden said coating, and supporting only the hardened portion of the advancing end of said coated pipe as it passes through said bath, the trailing portion of said pipe being supported substantially at the point of extrusion of said coating layer.

6. A method of coating a continuously advancing pipe composed of successive lengths temporarily coupled together, comprising the steps of extruding a thick layer of hot thermoplastic material on the outer surface of said pipe, supporting said coated pipe substantially at the point of extrusion before said coated pipe emerges from the coating means, and at a second point removed from said first named point, passing said coated pipe beneath the surface of a body of cooling liquid at a point intermediate said first and second points and without contacting any other solid supporting surface, to cool the coating so that it will be hardened by the time it reaches said second point of support, and separating said successive lengths of coated and cooled pipe.

7. A method of coating pipe, comprising the steps of temporarily coupling successive sections of pipe together to form a continuous portion in such a manner as to cover a short length of said pipe sections on each of the abutting ends thereof to preclude a deposition of coating thereon, extruding a thick layer of hot thermoplastic material on the outer surface of said continuous portion intermediate the protected end sections, and, prior to any contact of said coated continuous portion with any solid supporting surface cooling said coated pipe, separating said successive sections and uncovering said pipe ends, whereby to provide independent pipe sections with a continuous coating except for a short length at each end thereof.

8. A method of coating pipe, comprising the steps of temporarily coupling successive sections of pipe together to form a continuous portion in such a manner as to cover a short length of said pipe sections on each of the abutting ends thereof to preclude a deposition of coating thereon, extruding a thick layer of hot thermoplastic material on the outer surface of said continuous portion intermediate the protected end sections, cooling said continuous portion and while cooling, separating the successive sections and uncovering said pipe ends, whereby to provide independent pipe sections with a continuous coating except for a short length at each end thereof.

9. A method of coating pipe, comprising the steps of temporarily coupling successive sections of pipe together to form a continuous portion in such a manner as to cover a short length of said pipe sections on each of the abutting ends thereof to preclude a deposition of coating thereon, extruding a thick layer of initially plastic coating material on the outer surface of said continuous portion intermediate the protected end sections, permitting said coating to harden, separating the successive sections and uncovering said pipe ends, whereby to provide independent pipe sections with a continuous coating except for a short length at each end thereof.

WILLIAM R. POSTLEWAITE.